June 17, 1952  G. C. KEARSE  2,600,992
PEANUT HARVESTER
Filed Nov. 15, 1946  7 Sheets-Sheet 1
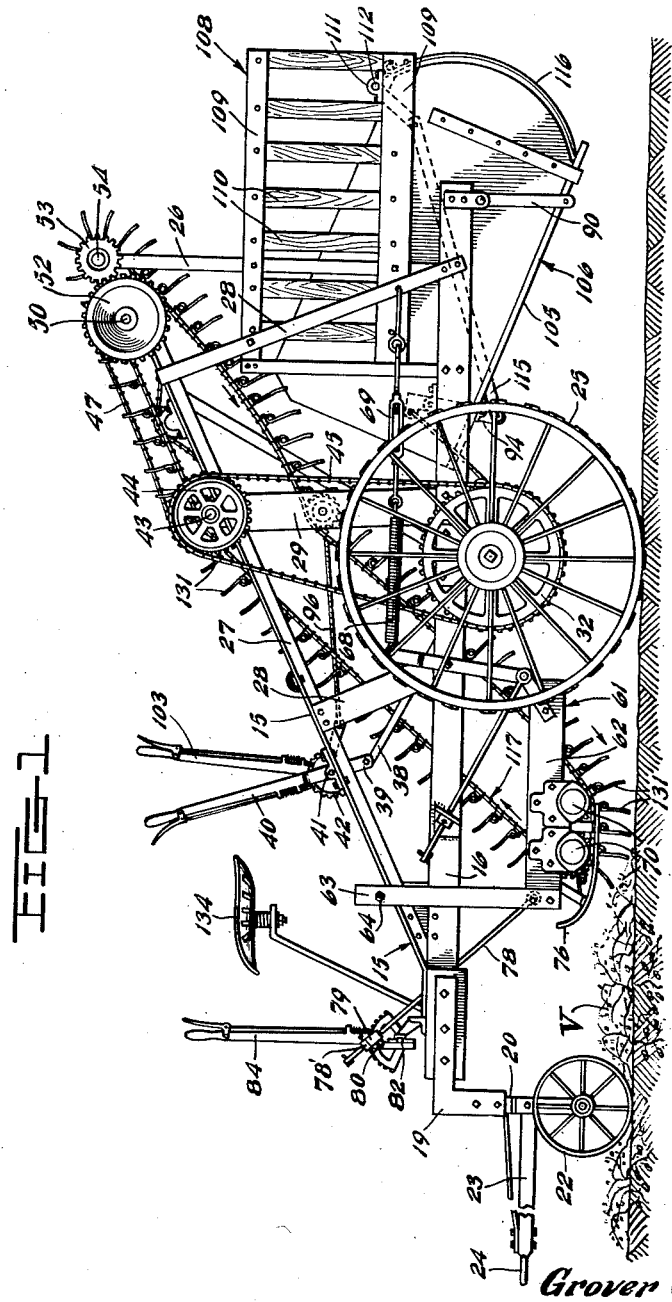
Inventor
Grover C. Kearse
By Clarence A. O'Brien
and Harvey B. Jacobson
Attorneys

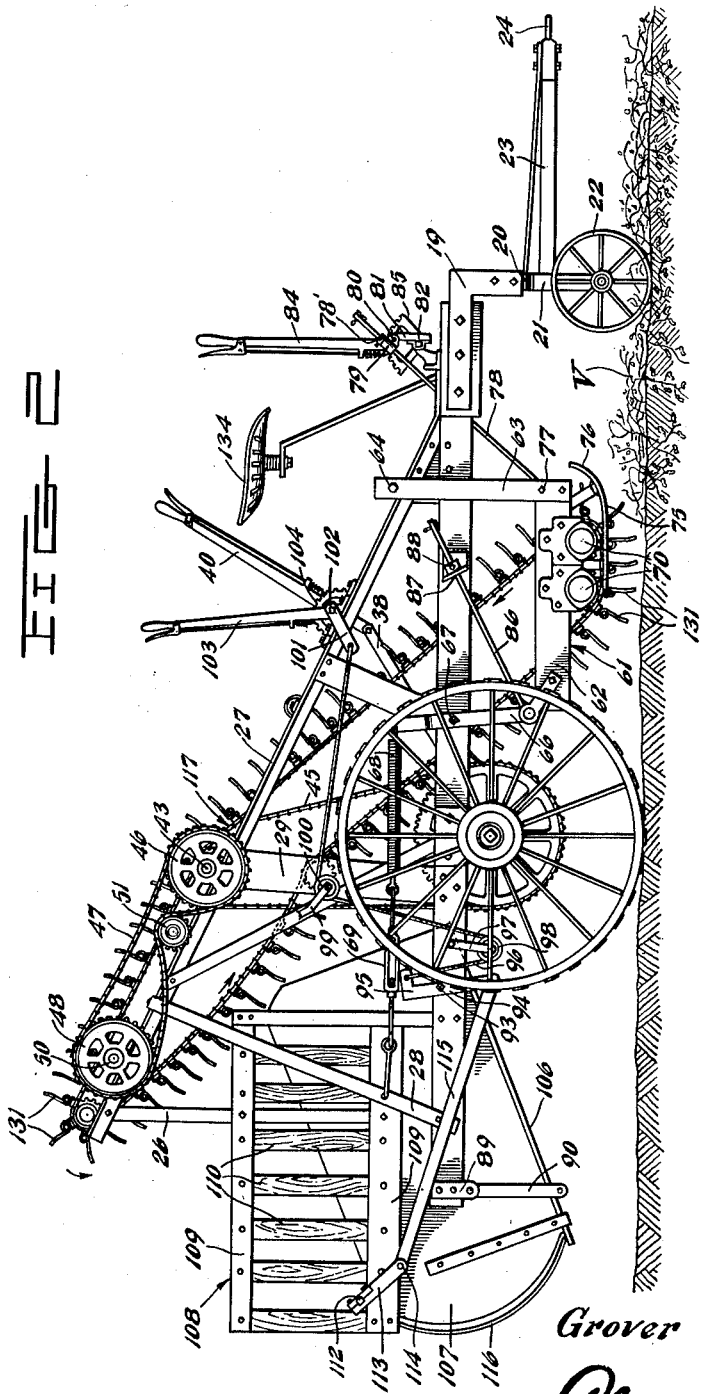

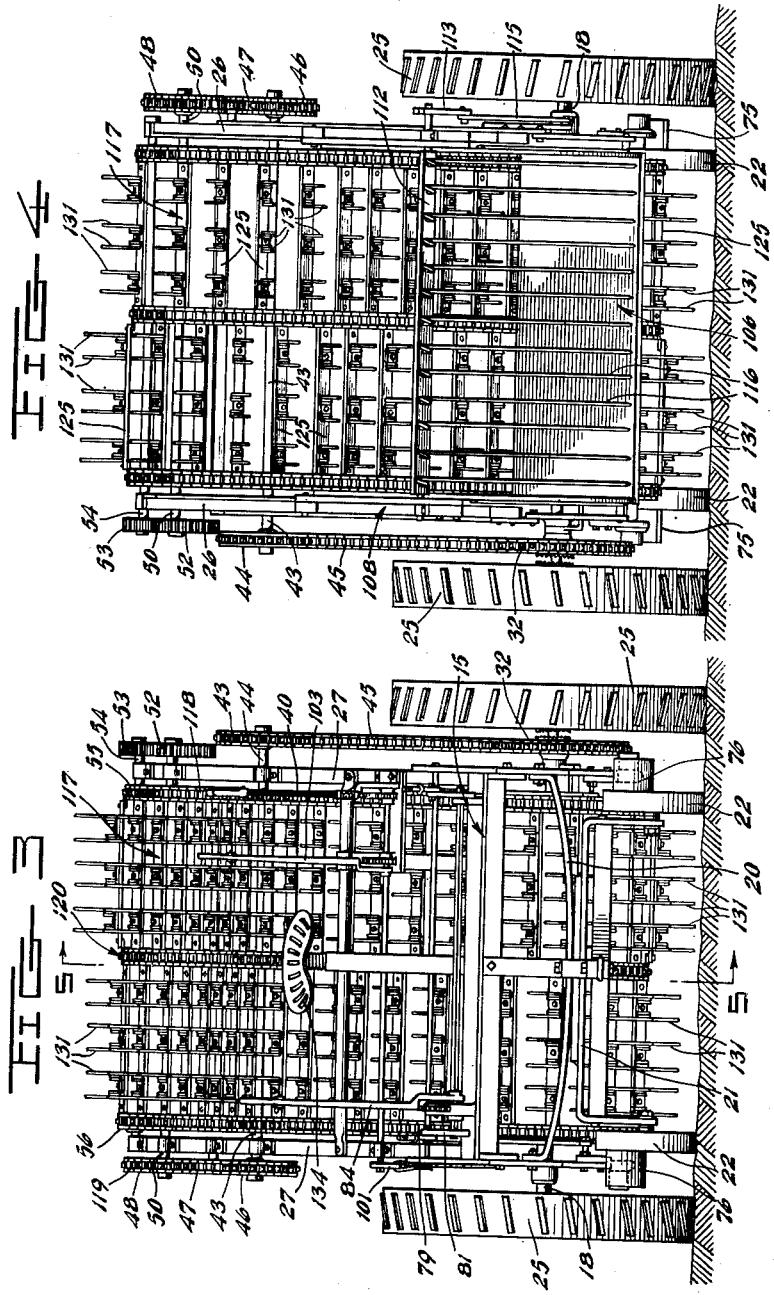

June 17, 1952
G. C. KEARSE
2,600,992
PEANUT HARVESTER
Filed Nov. 15, 1946
7 Sheets-Sheet 4
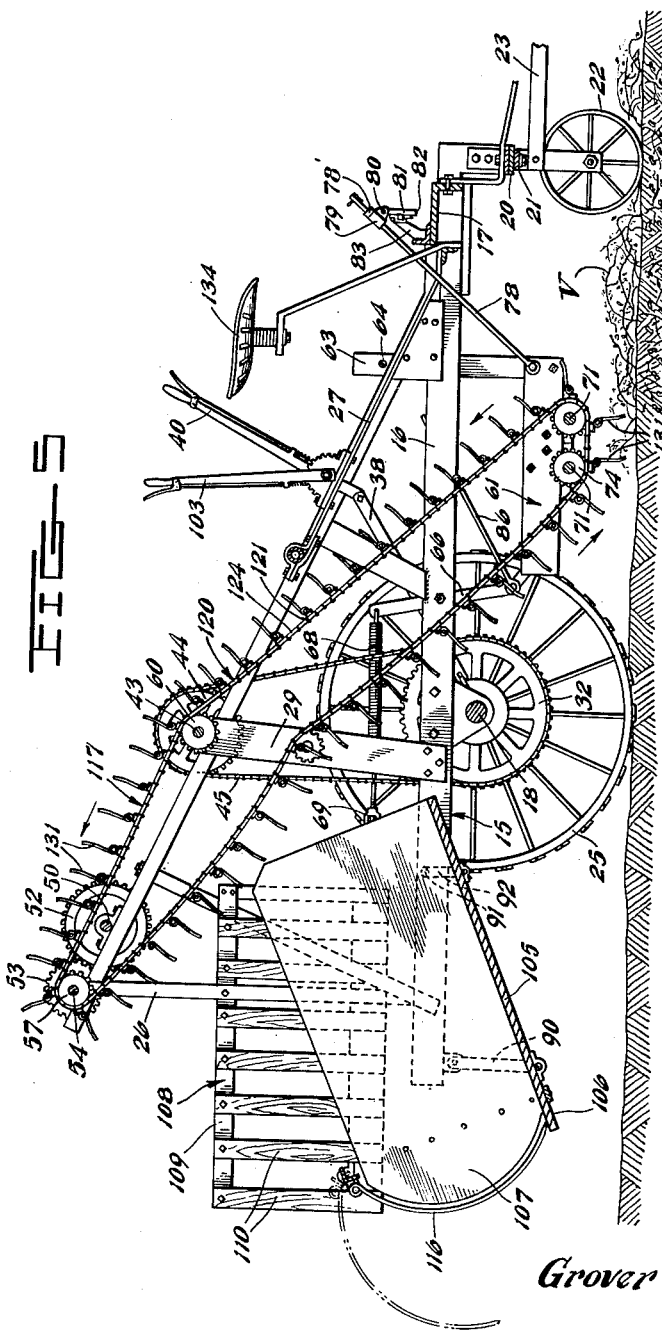
Inventor
Grover C. Kearse
By Clarence A. O'Brien
and Harvey B. Jacobson
Attorneys June 17, 1952  G. C. KEARSE  2,600,992
PEANUT HARVESTER
Filed Nov. 15, 1946  7 Sheets-Sheet 5
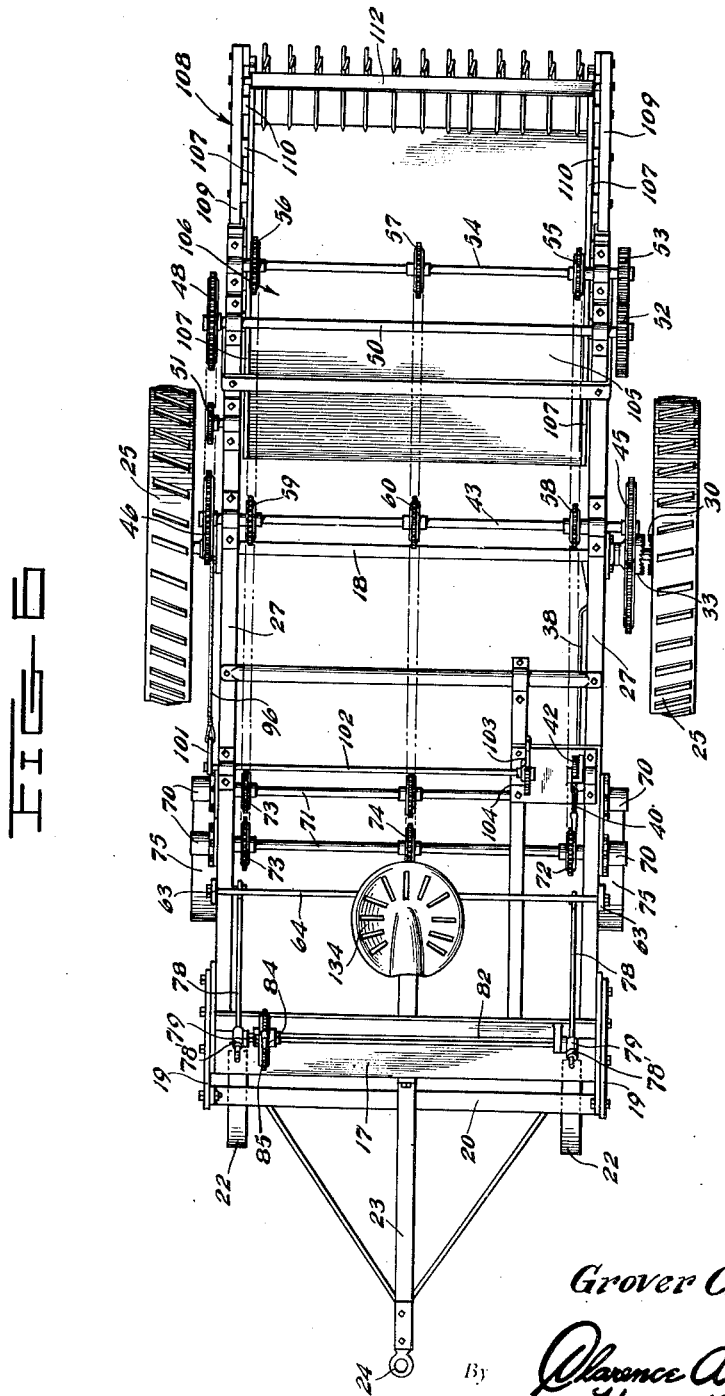
Inventor
Grover C. Kearse June 17, 1952  G. C. KEARSE  2,600,992
PEANUT HARVESTER
Filed Nov. 15, 1946　　　　　　　　　　　　　　　　7 Sheets-Sheet 6
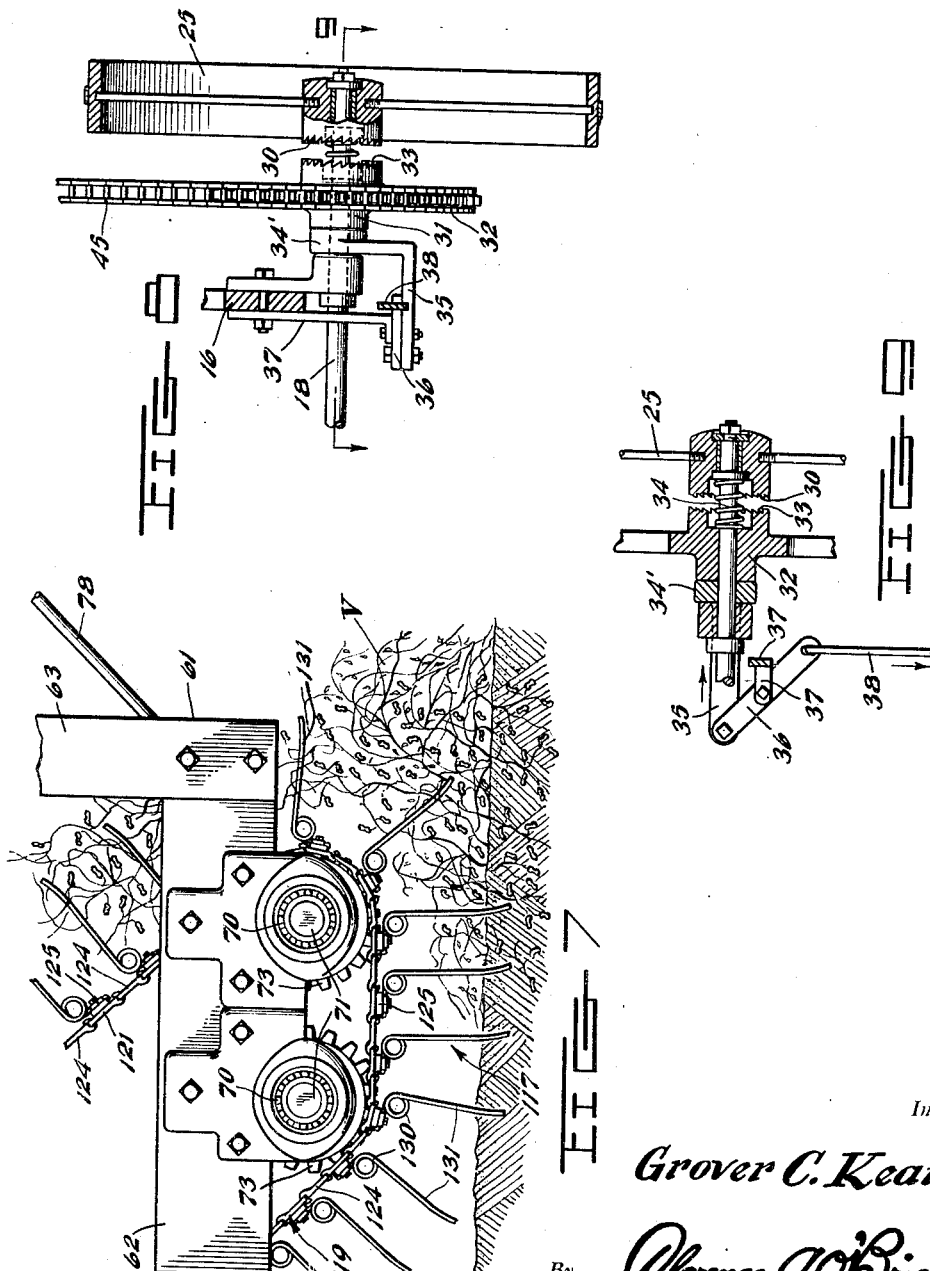
Inventor
Grover C. Kearse
By Clarence A. O'Brien
and Harvey B. Jacobson
Attorneys

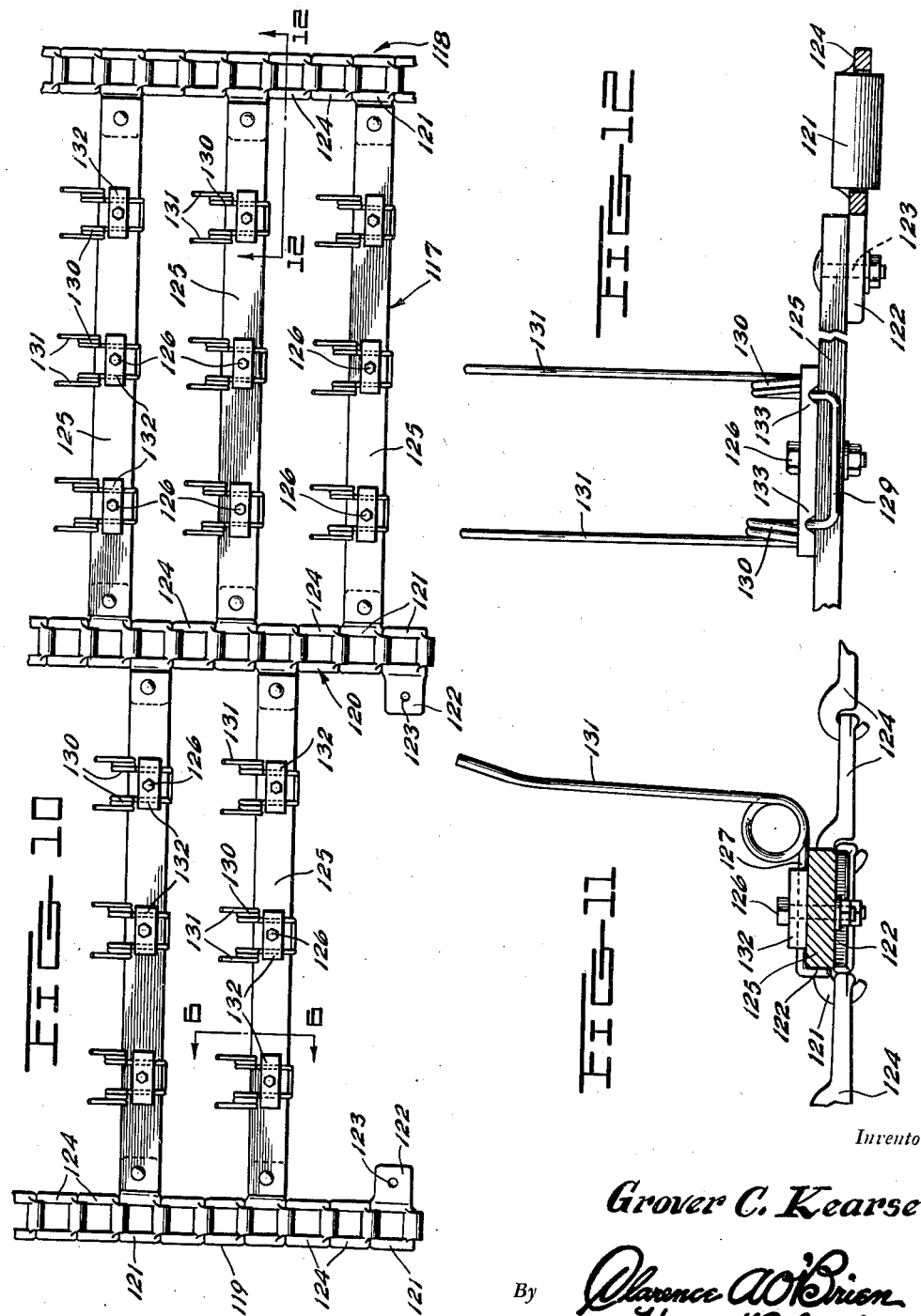

Patented June 17, 1952

2,600,992

UNITED STATES PATENT OFFICE 2,600,992

PEANUT HARVESTER

Grover C. Kearse, Leesburg, Ga.

Application November 15, 1946, Serial No. 710,075

2 Claims. (Cl. 198—13.)

This invention relates to a peanut harvester and more particularly to a machine of the trailer type adapted to follow a plow by which the peanuts and their vines are loosened in the ground.

Peanut harvesters fall into two general classes; namely, those which are equipped with plows for digging the peanuts and vines loose from the ground and subsequently lifting the vines and peanuts from the ground and depositing them either in piles on the ground or in a hopper for subsequent disposal and the other type of machine which is adapted to be connected to a plow as a trailer to lift the plowed up vines with the peanuts attached and deposit them in piles or in a hopper for subsequent disposal. The machine to which this invention relates is of the latter type and constitutes a separate and distinct unit from the plow.

The primary object of the invention is to follow a peanut plowing machine and to gather the peanuts on the vines, and elevate them for subsequent deposit in a hopper which may periodically be agitated to shake the dirt and debris from the peanuts and vines.

Another object is to accumulate a number of peanut vines in the hopper and discharge them periodically in the form of separate piles.

A still further object is to remove the debris from the peanuts and the vines before they are deposited in the piles subsequently to be gathered.

The above and other objects may be attained by employing this invention which embodies among its features, a wheeled main frame, a sub-frame supported beneath the main frame to move rearwardly with relation thereto, an upwardly and rearwardly inclined elevator supported at its upper end in the main frame and at its lower end in the sub-frame, fingers carried by the elevator to engage vines on the ground and deliver them and dump them from the upper rear end of the elevator and means yieldingly to urge the sub-frame towards the front end of the main frame.

Other features include means to regulate the height of the front end of the sub-frame with relation to the main frame to govern the depth to which the fingers enter the ground which has been previously loosened by plows, and a movable hopper at the rear end of the main frame into which the vines are deposited by the conveyor.

Other features include means for shaking the hopper with vines contained therein so as to shake loose earth and debris from the vines and peanuts thus gathered.

Still further features include an end gate at the rear end of the hopper adapted periodically to be opened by the operator in order to dump the contents of the hopper in a pile upon the ground.

In the drawings:

Figure 1 is a side view of a peanut harvester embodying the features of this invention;

Figure 2 is a side view taken from the side opposite Figure 1;

Figure 3 is a front view of the harvester;

Figure 4 is a rear view thereof;

Figure 5 is a longitudinal sectional view taken substantially along the line 5—5 of Figure 3;

Figure 6 is a top plan view of the machine showing the chains and elevators removed therefrom;

Figure 7 is a fragmentary enlarged view of the front end of the sub-frame illustrating the vine gathering fingers in detail;

Figure 8 is a fragmentary enlarged sectional view through a portion of the frame and one of the drive wheels illustrating the clutch mechanism by which driving connection is established between the wheel and the elevator;

Figure 9 is a sectional view taken substantially along the line 9—9 of Figure 8;

Figure 10 is an enlarged plan view of a fragment of the elevator;

Figure 11 is an enlarged fragmentary sectional view taken substantially along the line 11—11 of Figure 10; and, Figure 12 is a fragmentary front view of Figure 11.

Main frame

Referring to the drawings in detail, the main frame of this invention is designated generally 15 and comprises a pair of side bars 16 held in spaced parallel relation at their forward ends by a platform 17 and a horizontally extending axle 18 located approximately midway of the length of the frame. Secured to the forward end of each side bar is an L-shaped bracket 19 the forward leg of which extends downwardly and has connected thereto a cross bar 20 which as illustrated in Figure 3 is bowed so that its middle portion is below the general level of the lower ends of the downwardly projecting legs of the L-shaped brackets 19. Pivotally supported intermediate the ends of the cross bar 20 is an inverted U-shaped yoke 21 (Figure 3) to the lower ends of the legs of which are connected axle shafts upon which ground contacting wheels 22 are rotatably supported. A tongue 23 extends forwardly from the yoke 21 and carries at its extreme forward end a coupling clevis 24 by means of which the machine is connected to a traction vehicle such as a plow. Rotatably supported on opposite ends of the axle 18, on the outer sides of the frame 15 are bull wheels 25 which cooperate with the wheels 22 in supporting the frame 15 in substantially horizontally spaced relation to the surface being traversed. Carried adjacent the extreme rear ends of the side bars 16 are standards 26 forming the rear end supports of a pair of upwardly inclined bars 27 the forward ends of which are connected to the side bars 16 adjacent their forward ends. Suitable brace bars 28 are connected to the side bars 16 and the upwardly inclined bars 27 in order rigidly to support the latter in place on the main frame 15. A standard 29 rises from each side bar 16 and is connected to its respective inclined bar 27 slightly to the rear of the axle 18 in order to reinforce the inclined bars 27 at this point.

Elevator drive

Formed on the hub of one of the bull wheels 25 is an annular row of inwardly projecting teeth 30 (Figure 8), and slidably mounted on the shaft 18 adjacent the toothed end of the hub is the hub 31 of a drive sprocket 32. The end of the hub 31 of the drive sprocket 32 facing the toothed end 30 of the hub of the bull wheel 25 is an annular row of mating teeth 33 which when the hub 31 is advanced toward the hub of wheel 25 cooperates with the teeth 30 in driving the hub 31 in unison with the wheel. A compression coil spring 34 is disposed between the hubs in order normally to urge them apart as will be readily understood upon reference to Figure 9. Mounted for longitudinal sliding movement on the axle 18 adjacent the hub 31 is a collar 34' carrying a depending angle bracket 35 to which is pivoted one end of a lever 36. This lever is pivoted intermediate its ends to a bracket 37 which in turn depends from the side bars 16 of the frame 15 adjacent the sprocket 32, and connected to the end of the lever 36 opposite that which is connected to the bracket 35 is a pull rod 38 which extends forwardly and is connected as at 39 to the lower end of a clutch control lever 40 pivoted as at 41 to the upwardly and rearwardly inclined bar 27 on the side of the machine adjacent the sprocket 32. This lever is held in various adjusted positions about its pivot 41 by means of a latch and quadrant 42 of any conventional type which will enable pull to be exerted on the pull rod 38 in order to move the clutch teeth 33 to engagement with the clutch teeth 30, against the compression of the spring 34, so as to establish driving connection between the adjacent bull wheel 25 and the sprocket 32. Mounted in suitable bearings carried on the upper sides of the upwardly inclined bars 27 directly above the column 29 is a drive shaft 43 carrying at one end a drive sprocket 44. A drive chain 45 establishes driving connection between the sprocket 32 and the sprocket 44, it being understood that the sprocket 44 is fixed to the shaft 43 adjacent the end which overhangs the sprocket 32.

Fixed to the opposite end of the drive shaft 43 is a drive sprocket 46 which has driving connection through the medium of a chain 47 with a sprocket 48 fixed to one end of a driven shaft 50 which extends transversely of the machine near the upper rear ends of the upwardly inclined bars 27 (Figure 2). A suitable idler sprocket 51 engages the bottom run of the chain 47 in order to preserve proper tension thereon and prevent the sagging thereof. Mounted on the end of the shaft 50 opposite that carrying the sprocket 48 is a drive gear 52 which has meshing engagement with a drive pinion 53 fixed to one end of the elevator drive shaft 54 (Figure 1). This elevator drive shaft 54 extends transversely of the machine at the upper rear ends of the upwardly inclined bars 27 and has fixed thereto immediately inside of the upwardly inclined bars 27 drive sprockets 55 and 56, and fixed to the shaft 54 midway between the side bars or rails 27 is an elevator drive sprocket. It will thus be seen that when the lever 40 is shifted to cause the clutch teeth 33 to engage the clutch teeth 30, and the machine is in motion pull will be transmitted to the elevator drive sprockets 55, 56 and 57 to cause the upper run of the elevator to move upwardly and rearwardly of the frame 15. Suitable idler sprockets 58 and 59 are mounted to rotate on the shaft 43 adjacent the upwardly inclined bars 27 and a similar idler sprocket 60 is rotatably supported on the shaft 43 midway between the upwardly inclined bars 27 as will readily be understood upon reference to Figure 6. These idler sprockets are adapted to cooperate with the drive sprockets in supporting the upper runs of the drive chains of the elevator to be more fully hereinafter described.

Sub-frame

The sub-frame designated generally 61 comprises a pair of spaced side bars 62 carrying at their extreme forward ends a pair of upwardly extending arms 63, the upper ends of which are joined by a tie rod 64. Each side bar 62 carries adjacent its rear end an upwardly and rearwardly extending bracket arm 65 to each of which is connected the lower end of a lever 66 which is pivotally connected as at 67 intermediate its ends to a side bar 16. Attached to the upper end of each lever 66 is a retractile coil spring 68, the opposite end of which is connected through the medium of a turnbuckle 69 to the rearmost brace bar 28 on its respective side of the machine. Fixed to each side bar 62 adjacent its forward end is a pair of spaced anti-friction bearings 70 in which spaced parallel shafts 71 are rotatably supported. Each of these shafts is provided adjacent a side bar 62 with a guide sprocket 72 and 73, and attached to each shaft 71 midway between the side bars 62 is a guide sprocket 74. As illustrated in Figure 6 the drive sprocket 55 aligns with the idler sprocket 58 and the guide sprockets 72, while each drive sprocket 56 aligns with the idler sprocket 59 and the guide sprockets 73, likewise the drive sprocket 57 aligns with the idler sprocket 60 and the guide sprockets 74, so that chains trained over these respective sets of sprockets will operate in parallel planes. Supported on a suitable depending bracket at the forward end of each side bar 62 is a shoe 75, the forward end of each of which is curved upwardly as at 76, so that when the frame 61 is tilted downwardly the shoes will serve to limit the depth to which the vine elevating fingers to be more fully hereinafter described may enter the ground.

Pivotally secured as at 77 adjacent the forward end of each side bar 62 is a pull rod 78 which extends upwardly and forwardly as illustrated in Figures 1 and 2 and their upper ends are slidably received in sleeves 79 which are pivotally connected as at 80 to rock arms 81 carried adjacent opposite ends of a rock shaft 82 which is mounted in suitable bearing brackets 83 attached to the upper side of the platform 17. A stop collar 78' is mounted on each pull rod 78 for longitudinal adjustment thereon. A hand lever 84 is fixed to the rock shaft 82 and is held in various adjusted positions about the axis of the shaft 82 by means of a latch and quadrant 85 of any conventional form. It will thus be seen that by manipulating the lever 84 the forward end of the frame 61 may be raised or lowered to suit the requirements.

Pivotally connected to the junctions of the brackets 65 and the levers 66 are upwardly and forwardly extending suspension rods or drag links 86, the upper ends of which are slidably and lockably supported in brackets 87 carried by the side bars 16, and adjustably attached to the ends of the drag links or rods 86 which project through the brackets 87 are stop collars 88 which serve to limit rearward and downward movement of the rear end of the frame 61.

Hopper

Pivotally suspended from a bracket 89 adjacent the rear end of each side bar 16 is a link 90, and pivoted to one of the side bars as at 91 somewhat in advance of the link 90 on its respective side of the machine is a link 92 of somewhat shorter length than the links 90. Pivoted as at 93 to the opposite side bar 16 is a lever 94, the lower end of which extends downwardly to a plane coincidental with the lower end of the link 92 while the upper end of said lever is provided with a forwardly extending arm 95 which is pierced to receive one end of a flexible cable 96. Attached to the side bars 16 on which the lever 94 is pivoted is a depending bracket 97 carrying a guide pulley 98 over which the cable 96 is trained, and mounted in a suitable bracket 99 secured to one of the brace bars on the side of the machine to which the lever 94 is pivoted is a guide pulley 100 over which the cable 96 is trained. As shown in Figure 2 the cable extends forwardly from the guide pulley 100, and its forward end is connected to a rock arm 101 carried by one end of a rock shaft 102 which is mounted to rotate in suitable brackets carried by the upwardly inclined bars 27 so as to lie in substantial alignment with the axis of the pivot of the lever 40. A hand lever 103 is connected to the rock shaft 102 and is equipped with a latch and quadrant mechanism 104 of any conventional form to hold the lever 103 in various adjusted positions about the axis of the shaft 102. Supported on the lower ends of the links 90, the link 92 and the lever 94 is the bottom 105 of a hopper designated generally 106. Extending upwardly from opposite side edges of the bottom 105 are side walls 107, the forward upper portions of which lie adjacent the inner side of the side bars 16, while their rear portions extend somewhat beyond the rear ends of the side bars. The upper and lower edges of the side panels 107 lie parallel with one another, but due to the difference in length between the link 92, the lever 94 and the links 90 it will be obvious that the hopper 106 will incline rearwardly and downwardly.

Mounted or otherwise secured to each standard 26 immediately above the hopper 106 is a guide rack designated generally 108 each side of which comprises a pair of spaced horizontally disposed supporting bars 109 between which extend vertically disposed spaced parallel slats 110. Pivotally supported in suitable brackets 111 carried adjacent the extreme rear ends of the bottom bars 109 of the rack 108 is a horizontally extending rock shaft 112. A rock arm 113 is fixed to one end of the rock shaft 112, and pivoted at 114 to the rock arm 113 is one end of a link 115, the opposite end of which is pivoted to the extreme lower end of the lever 94. Secured at longitudinally spaced intervals to the rock shaft 112 are depending tines 116 which as illustrated in Figures 4 and 5 form an end gate for the lower rear end of the hopper 106. It will thus be seen that rapid movement of the lever 103 through a short arc will cause the hopper 106 to vibrate so as to shake the dirt from the vines collected therein and upon movement of the lever 103 through a greater arc the rock arm 113 will be rotated to cause the shaft 112 to move the tines 116 into a position to clear the rear end of the hopper as suggested by the dotted lines in Figure 5. Obviously, any slight opening of the rear end gate resulting from the movement of the lever 103 through the short arc may be so controlled as merely to agitate the contents of the hopper 106 without discharging the vines contained therein.

Elevator

The elevator designated generally 117 is made up of a plurality of chains 118, 119 and 120 which are respectively trained over the drive sprocket 55, idler sprocket 58 and guide sprockets 72; drive sprocket 56, idler sprocket 59 and guide sprockets 73; and drive sprocket 57; idler sprocket 60; and guide sprockets 74. It will thus be seen that the central chain 120 is located midway between opposite sides of the frame 15 while the chains 119 and 118 operate adjacent the sides of the frame 15. As illustrated in Figure 10, it is to be noted that the chain 120 is made up of groups of links 121 having lateral extensions 122 which are pierced as at 123 to receive attaching elements such as bolts to which transversely extending slats are attached. As illustrated, the groups of links 121 are separated by a single link 124 which is plain and not provided with the lateral extensions 122, and the adjacent links 121 have the extensions 122 projecting in opposite directions. The side chains 118 and 119 are composed of plain links 124 in groups of two and between each group is interposed a link 121 with its lateral extension arranged to align with the lateral extension on a link 121 of the chain 120, and extending between the extensions 122 on the links 121 are transversely extending bars or flights 125. By the staggered arrangement of the links 121 the flights 125 on opposite sides of the elevator are in staggered position as will be readily understood upon reference to Figure 10. Each flight 125 is provided with longitudinally spaced openings for the reception of attaching bolts 126 by which the spring fingers to be more fully hereinafter described are attached to the flights.

Each spring finger above referred to comprises a pair of spaced parallel arms 127 each of which is bent downwardly adjacent one end as at 128, and these downturned ends 128 are joined by a cross bar 129. Formed at the ends of the side arms 127 are spring loops 130 from which project upwardly spaced parallel spring fingers 131. A group of anchor plates 132 are attached to each flight 125 by means of the attaching bolts 126, and each anchor plate is provided in its underside with a pair of spaced transversely extending grooves 133 for the reception of the bars 127 of the spring fingers. As illustrated in Figure 11 the angularly extending arms 128 and the cross member 129 engage one side edge of each flight 125 in order to reinforce the connection between the fingers 131 and their respective flight 125. By the staggered arrangement of the flights 125 on opposite sides of the elevator 117 it is obvious that when the elevator is discharging its load at the upper end of the upwardly inclined bars 27 no interference of the discharge of one set of flights will be experienced during the discharge of the opposite set of flights.

*Operation*

In use, it will be understood that when the operator, occupying the operator's seat 134 adjacent the forward end of the frame 15, manipulates the lever 40, the teeth 33 may be brought into engagement with the teeth 30 of the bull wheel 25 so that with the forward motion of the machine power will be transmitted to drive the elevator 117 and cause the spring fingers 131 to travel in the direction of the arrows illustrated in Figures 1 and 2 to gather the vines V which have been plowed up in advance and raise them on the elevator 117 toward the upper rear ends of the bars 27. The depth to which the fingers 131 enter the ground is governed by manipulation of the lever 84 by which the front end of the sub-frame 61 may be raised or lowered. Should an obstacle be encountered such as a rock or boulder the sub-frame is free to move upwardly and forwardly being guided by the pull rods 78 and drag links 86. Upon returning to lowered position, the rear end of the frame 61 will be suspended on the springs 68, and hence the depth to which the spring fingers 131 enter the ground is limited. The shoes 75 also serve to protect the forward lower end of the elevator 117 from injury through contact with immovable objects. The vines and their fruit being carried up the elevator 117 will be deposited in the hopper 106 to be carried along until such time as a sufficient number of vines have been accumulated therein whereupon the lever 103 is operated first by a short reciprocable motion to shake the hopper 106 on the links 90 and thereby remove the dirt which may be clinging to the vines and their fruit. Having shaken the earth loose from the vines, the lever 103 is then moved rearwardly about its pivot through an arc of sufficient length to exert pull on the cable 96 and cause the lever 94 to move about its pivot 93 to move the link 115 rearwardly so as to rock the rock shaft 112 and move the tines 116 into the broken line position illustrated in Figure 5 to permit the contents of the hopper 106 to be deposited in a pile on the ground for subsequent gathering. In this way, the piles of cleaned vines to which the fruit remains attached are produced and the arduous task of shaking the vines by hand to remove the dirt is eliminated.

While in the foregoing there has been shown and described the preferred embodiment of this invention it is to be understood that minor changes in the details of construction, combination and arrangement of parts may be resorted to without departing from the spirit and scope of the invention as claimed.

This application is a continuation in part of my copending application Serial No. 582,238, filed March 12, 1945, and now abandoned.

I claim:

1. In a peanut harvester including an elongated wheeled frame having forward and rear ends, a rear conveyor support rising from the rear end of the frame, a forward conveyor support paralleling and underlying the frame, means pivotally securing the forward conveyor support to the forward end of the frame to permit vertical swinging movement of the forward conveyor support, spring means connecting the forward conveyor support to the frame and yieldingly urging the forward conveyor support raised, a pair of spaced parallel horizontal shafts rotatably supported by said forward support and disposed transversely of the frame, said shafts always remaining parallel to said frame throughout swinging of said forward support, sprockets on said shafts, an upwardly and rearwardly inclined endless conveyor mounted on said forward and rear supports and including endless sprocket chains trained about said sprockets and teeth, a pair of pull rods pivoted to said forward support for vertical swinging movement, a transverse rockshaft carried by the frame and including laterally projecting rock arms at its ends, sleeves pivoted to said rock arms and slidably receiving said rods, stop collars longitudinally adjustable on said rods for said sleeves, a lever fixed to the rockshaft for rotating the rockshaft to selectively raise and lower said forward support, and means forming a sliding connection between said forward support and said frame to guide the pivotal movement of said forward support and to limit the downward pivotal movement of said forward support relative to the frame.

2. The combination of claim 1 wherein said means forming a connection between said forward support and said frame includes drag links pivoted to said forward support, brackets mounted on said frame rockably and slidably receiving said drag links, and stop collars secured to said drag links above said brackets for engaging said brackets during lowering of said forward support.

GROVER C. KEARSE.

REFERENCES CITED

The following references are of record in the file of this patent:

UNITED STATES PATENTS

| Number | Name | Date |
|---|---|---|
| 930,719 | Battee | Aug. 10, 1909 |
| 1,457,668 | Null | June 5, 1923 |
| 1,726,604 | Amen | Sept. 3, 1929 |
| 2,080,336 | Powell | May 11, 1937 |
| 2,095,428 | Batie | Oct. 12, 1937 |